(12) United States Patent
Lamp et al.

(10) Patent No.: US 7,662,497 B2
(45) Date of Patent: Feb. 16, 2010

(54) SOLID OXIDE FUEL CELL WITH A METAL BEARING STRUCTURE

(75) Inventors: Peter Lamp, Kaufering (DE); Thomas Hoefler, Munich (DE); Marco Brandner, Aachen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 6 days.

(21) Appl. No.: 11/686,593

(22) Filed: Mar. 15, 2007

(65) Prior Publication Data

US 2008/0057363 A1 Mar. 6, 2008

Related U.S. Application Data

(63) Continuation of application No. PCT/EP2005/009022, filed on Aug. 20, 2005.

(30) Foreign Application Priority Data

Sep. 18, 2004 (DE) ........................ 10 2004 045 375

(51) Int. Cl.
*H01M 2/02* (2006.01)
(52) U.S. Cl. .......................................... 429/30; 429/37
(58) Field of Classification Search .................. 429/12, 429/30, 34, 36, 38, 20, 37, 39
See application file for complete search history.

(56) References Cited

U.S. PATENT DOCUMENTS

| 6,061,190 | A | 5/2000 | Kane et al. | |
|---|---|---|---|---|
| 2004/0018406 | A1 | 1/2004 | Herman et al. | |
| 2004/0048128 | A1 | 3/2004 | Jankowksi et al. | |
| 2004/0151975 | A1* | 8/2004 | Allen .......................... | 429/38 |
| 2005/0118482 | A1* | 6/2005 | Sriramulu et al. ............. | 429/34 |

FOREIGN PATENT DOCUMENTS

| DE | 197 57 318 C1 | 2/1999 |
|---|---|---|
| DE | 100 40 499 A1 | 3/2002 |
| DE | 102 07 854 A1 | 2/2003 |
| DE | 102 38 860 A1 | 3/2004 |
| EP | 1 282 186 A1 | 2/2001 |
| EP | 1 271 684 A2 | 1/2003 |
| EP | 1 455 404 A2 | 9/2004 |

* cited by examiner

*Primary Examiner*—Patrick Ryan
*Assistant Examiner*—Monique Wills
(74) *Attorney, Agent, or Firm*—Crowell & Moring LLP

(57) ABSTRACT

Solid oxide fuel cells with a metal bearing structure, having passage orifices for a gas and intended for a cathode-electrolyte-anode unit. A bipolar plate is provided on the other side of the bearing structure, or the like. The bearing structure is made of a metal, which forms a protective oxide layer, which is electrically insulating, and operates as an electric resistance heating element for adjusting the fuel cell temperature. An electric current may be guided through the bearing structure between its protective oxide layers.

15 Claims, 2 Drawing Sheets

SOLID OXIDE FUEL CELL WITH A METAL BEARING STRUCTURE

CROSS-REFERENCE TO RELATED APPLICATIONS

This application is a continuation of International Patent Application No. PCT/EP2005/009022 filed Aug. 20, 2005 which claims benefit to German patent application Serial No. 10 2004 045 375.6 filed Sep. 18, 2004, the entire disclosures of which are hereby incorporated in their entirety.

FIELD OF THE INVENTION

The invention relates to a solid oxide fuel cell comprising a metal bearing structure for a cathode-electrolyte-anode unit. The metal bearing structure serves to heat the fuel cell and includes passage orifices for a gas. A bipolar plate is provided on the other side of the bearing structure, or the like.

BACKGROUND AND SUMMARY OF THE INVENTION

Solid oxide fuel cells (solid oxide fuel cell, SOFC) are used to convert the chemical energy of a combustible gas together with an oxidizer, e.g., atmospheric oxygen, on the direct way electrochemically into electric energy. See, e.g. DE 102 38 860 A1, but also to EP 1 271 684 A1 (U.S. Pat. No. 6,737,182) the disclosures of which are incorporated herein by reference.

The conversion of the combustible gas and the atmospheric oxygen into electric energy is conducted on and in ceramic layers (cathode, electrolyte, anode). In planar fuel cells a cell consists of a planar configuration of the ceramic layers. So-called bipolar plates are used to supply the combustible gas and the air, to dissipate the residual gases and to provide an electric connection between the individual fuel cells, which are stacked one above the other, in a serial arrangement, that is, in so-called stacks. The ceramic layers may also be a part of these bipolar plates. At the same time it must be guaranteed that the combustible gas and the air do not make direct contact with each other at any point in the stack of fuel cells. In particular, the bipolar plates may form, together with the ceramic layers, a cassette, which encloses one type of gas, in particular the combustible gas.

The operating temperature of solid oxide fuel cells ranges from 600 degrees C. to 900 degrees C. The temperature of solid oxide fuel cells is usually raised relatively slowly to their operating temperature to avoid damage due to the occurrence of thermomechanical stress between the ceramic layers with each other and/or between the ceramic composite and the bipolar plates. Thermomechanical stresses between the ceramic layers with each other and/or between the ceramic composite and the bipolar plates may lead, in particular, to micro-cracks in the ceramic layers as well as in the ceramic-ceramic interfaces and between the ceramic-metal interfaces and, thus, to the destruction of the SOFC.

For use in motor vehicles, fuel cells with very short start up times are necessary. One approach is to apply the ceramic functional layers not in a self bearing manner (e.g., the electrolyte or the anode as a substrate), but rather as thin layers on a metal substrate (e.g., sintered metal or a perforated foil, see, for example, DE 102 38 860 A1). In addition to the thermomechanical stability, another limiting factor is the introduction of the necessary amount of heat. EP 1-271 684 A2 describes the possibility of raising the temperature of a solid oxide fuel cell to its operating temperature of an electric resistance heating element. In this patent, metal foils, which are provided between the ceramic layers, are put under electrical stress, thus generating heat by the resulting current flow. However, this solution requires an additional component, whose integration and contacting in the stack means a significant increase in the complexity of such a SOFC. Therefore, the described method runs the risk that, when the exterior side of the metal foil or of the other metal components is not electrically insulated, electric short circuiting ensues over the bipolar plates or the electrodes of the SOFC, thus electrically bridging the "heating foil" and rendering it inactive.

It shall hereby be provided now a solid oxide fuel cell comprising a metal bearing structure, which exhibits passage orifices for a gas and is intended for a cathode-electrolyte-anode unit, and comprising a bipolar plate, which is provided on the other side of the bearing structure, or the like. With respect to raising the temperature of said cell, said cell can be electrically heated and yet is provided by a simple and reliable construction.

SUMMARY OF THE INVENTION

In one embodiment of the invention, a solid oxide fuel cell comprising a metal bearing structure for a cathode-electrolyte-anode unit, said metal bearing structure having passage orifices for a gas and being configured to operate as an electric resistance heating element for adjusting the fuel cell temperature is provided. The metal bearing structure has a protective oxide layer which is electrically insulating for the metal bearing structure; a bipolar plate; and an electrically conductive material in at least some of the passage orifices of the metal bearing structure which provides an electric connection with the bipolar plate. An electric current may be guided through the metal bearing structure and the cathode-electrolyte-anode unit is configured so that a gas may pass through the passage orifices of the metal bearing structure.

The inventive solution to the problems associated with prior SOFCs is to provide a bearing structure made of a metal, which forms a protective oxide layer, which is electrically insulating, and operates as an electric resistance heating element for adjusting the fuel cell temperature. An electric current may be guided through the bearing structure between its protective oxide layers; and an electrically conductive material is introduced in at least some of the passage orifices of the bearing structure for the purpose of providing an electric connection between the bipolar plate or the like. The associated cathode-electrolyte-anode unit is introduced in such a way that the gas can pass through these passage orifices. Advantageous designs and further developments are the subject of the dependent claims.

Therefore, proposed is an embodiment of a SOFC fuel cell, which remedies the major drawbacks of the prior art and thereby makes possible a solid oxide fuel cell that can start up quickly. The basis of a fuel cell, according to the invention, is a thin metal bearing structure. For example, a metal foil in the thickness range of 30 to 500 μm acts as the carrier of the ceramic functional layers of a SOFC fuel cell, which is either perforated in the area of the ceramic functional layer or exhibits its suitable passage orifices, formed in some other way, to enable the reaction gases to flow to the respective electrode. Preferably this metal bearing structure extends over the entire surface of the bipolar plate, including the gas guides, provided in the area on the edge, for the combustible gas and the air.

One feature of the proposed metal bearing structure is that this bearing structure is made of a material or rather a metal that constitutes in itself a protective oxide layer that is electrically insulating, i.e., in the sense of an auto-passivation.

Such preferred materials are so-called aluminum oxide formers, for example, Aluchrom Y Hf, or silicon oxide formers. If the metal foil, forming a protective oxide layer, or the like extends, as the bearing structure for the ceramic functional layers, over the entire cross sectional area of a stack of fuel cells, it is possible to insert also a sealing material, which conducts electrically, as the sealing material for the purpose of making the reactants gas tight with respect to each another, between the individual fuel cells that are stacked one above the other. The necessary electrical insulation between the individual cells is already guaranteed by the protective oxide layer of the bearing structure. Furthermore, this enables bearing structure to be used as the electric resistance heating element without having to be concerned about the risk of electric short-circuiting. The corresponding electric contacting, for the purpose of introducing electric current into the discharge of the electric current from the bearing structure, may be carried out, for example, by means of the corresponding electrical contacts on the outer periphery of the bearing structure. As the electric current passes through the bearing structure, the bearing structure heats up when suitably configured (to be discussed in detail below), so that the bearing structure itself may, therefore, operate as the electric resistance heating element.

An electric conductivity from an individual cell to the next adjoining individual cell is required for the fuel cell or rather a corresponding SOFC stack to function. This conductivity is usually generated by the so-called bipolar plate or the like. Therefore, inside the individual cell an electric connection should exist between the bipolar plate (or the like) and the side of the cathode-electrolyte-anode unit that faces said bipolar plate, whereupon there is an electric connection between the bipolar plate of a first individual cell and the side of the cathode-electrolyte-anode unit that faces said bipolar plate and belongs to an adjacent second individual cell. At this stage inside the individual cell the electrically conducting connection between the bipolar plate and the cathode-electrolyte-anode unit cannot simply be generated continuously (as was the case to date) by way of the metal bearing structure of the cathode-electrolyte-anode unit, since said cathode-electrolyte-anode unit forms, of course, an oxide layer that is electrically non-conducting. For this described function of the electric conductivity inside an individual fuel cell, a first embodiment of the present invention provides a porous or rather gas-permeable and electrically conductive material, which is introduced into the passage orifices in the bearing structure and which supplies the electrode with the respective gaseous reactant. This electrically conductive material may be, for example, a metal that is suitably treated or even an anode material or a cathode material (of the cathode-electrolyte-anode unit) or in general an electrically conductive ceramic. Therefore, the required "filling" of the passage orifices in the bearing structure so as to effect the electric contact may be carried out with an electrically conductive and simultaneously gas-permeable material with the use of, for example, squeegees, screen printing, rollers or the like. According to an alternative embodiment, it is also possible to apply a coating on the protective oxide layer at least in the area of some of the passage orifices in order to generate the electric conductivity by way of the bearing structure, forming the protective oxide layer. If, therefore, an electrically conductive material is applied (a process that may be carried out by electroplating, physical vapor deposition or the like) on the protective oxide layer of the bearing structure at least in the area of some of the passage orifices, an electric conductivity with simultaneous gas permeability of the passage orifices is easily and positively guaranteed.

With respect to the metal bearing structure, the passage orifices in the bearing structure may be produced by etching, punching, slotting, piercing or similar procedures. The hole structure, i.e., the shape of the passage orifices may be characterized, for example, by conical, elliptical, square, honeycomb-shaped or similar holes. The electric resistance and, thus, the heating power, which can be achieved at the bearing structure with the defined electrical voltage, may be adjusted to meet the respective requirements by, for example, a suitable choice of the thickness of the bearing structure as well as the structuring. Therefore, the electric resistance can be increased with a disproportionately high number of passage orifices, so that owing to the defined perforations, which vary locally, i.e., owing to the varying shape of the passage orifices, also locally variable amounts of heat may be introduced into the individual cell. In addition, owing to the choice and combination of the electrical interconnection, namely the series connection or the parallel connection of the individual "heating foils" in the fuel cell stack that is formed by the individual bearing structures of the individual cells, which are stacked one over the other, the overall electric resistance may be adjusted to the desired heating power and the supply voltage that is available.

The service life of a SOFC according to the invention, compared to that of the prior art, is advantageously longer. The protective oxide layer, forming on the bearing structure, is not only electrically insulating, but also chemically significantly more resistant than the metal substrates that are used today and that rely on their own high electric conductivity and have, depending on the oxidation, a shorter lifespan. Chemical resistance is defined in this context as the corrosion resistance to the gases in the SOFC and the corrosion resistance to the material properties of the interfusing elements that exert an effect. Moreover, the SOFC, which is presented here within the scope of the invention, is independent of the special configuration of the ceramic functional layers on the described bearing structure. Thus, it is possible to apply a commensurate unit in both the order of sequence anode-electrolyte-cathode and vice versa in the order of sequence cathode-electrolyte-anode. The SOFC, which is presented within the scope of the invention, is also independent of the precise method of conveying the gas and the subsequent electrical contacting in the stack, i.e., in the area of the bipolar plates or the like, the function of which may also be assumed, for example, by a metal knitted fabric. Thus the bearing structure may be utilized on a variety of different SOFCs.

BRIEF DESCRIPTION OF THE DRAWINGS

The attached schematic drawings depict a preferred embodiment.

FIG. 1 is an exploded cross section of an individual fuel cell, according to the invention; whereas

DETAILED DESCRIPTION OF THE DRAWINGS

Figure 1:
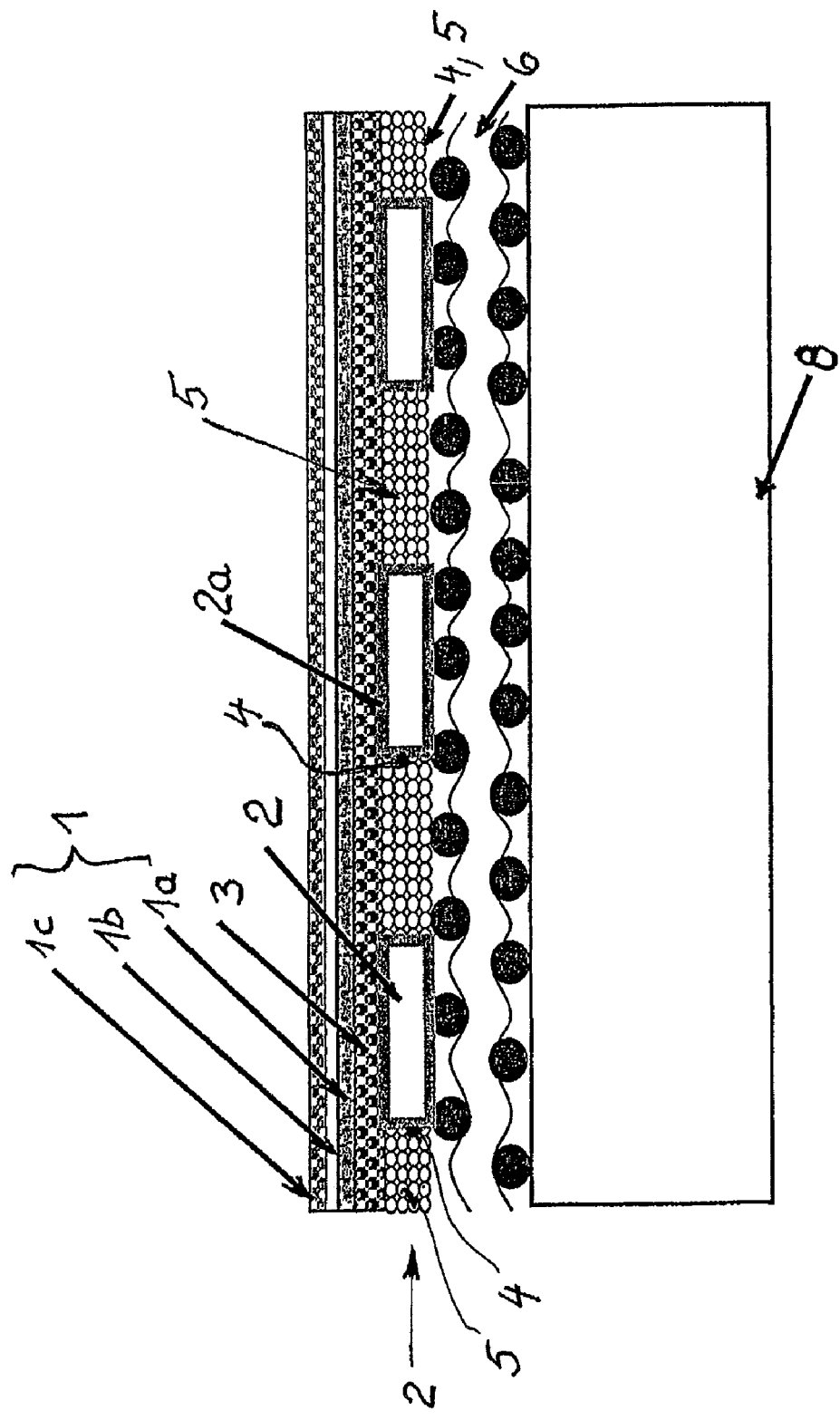

In the Figures, reference numeral 1 refers to the ceramic functional layers of an individual fuel cell in the form of a cathode-electrolyte-anode unit, whereas the anode layer bears the reference numeral 1a; the applied electrolyte, the reference numeral 1b; and the cathode, which is applied on said electrolyte, the reference numeral 1c. This cathode-electrolyte-anode unit 1 is applied on a bearing structure 2, but here a so-called anode substrate 3 is interposed. The bearing structure 2 is a thin metal foil or the like, into which the passage orifices 4 are introduced. Into these passage orifices 4 a gas-permeable, electrically conductive material 5 is introduced. In FIG. 1, below the bearing structure 2 there is a net structure 6 or the like, by way of which a gaseous reactant (combustible gas) may flow from the side to the underside of the bearing structure 2 and through its passage orifices 4, which are filled with a gas-permeable material 5, and may pass through the porous anode substrate 3 to the anode 1a of the cathode-electrolyte-anode unit 1. Adjoining the underside of this net structure 6 there is a bipolar plate 8; and under this bipolar plate there follows in turn the next fuel cell with its cathode layer (1c) (not illustrated). Similarly the next individual cell with its bipolar plate (8) (also not illustrated) may also be connected to the cathode layer 1c of the individual fuel cell, depicted in FIG. 1.

Figure 2:
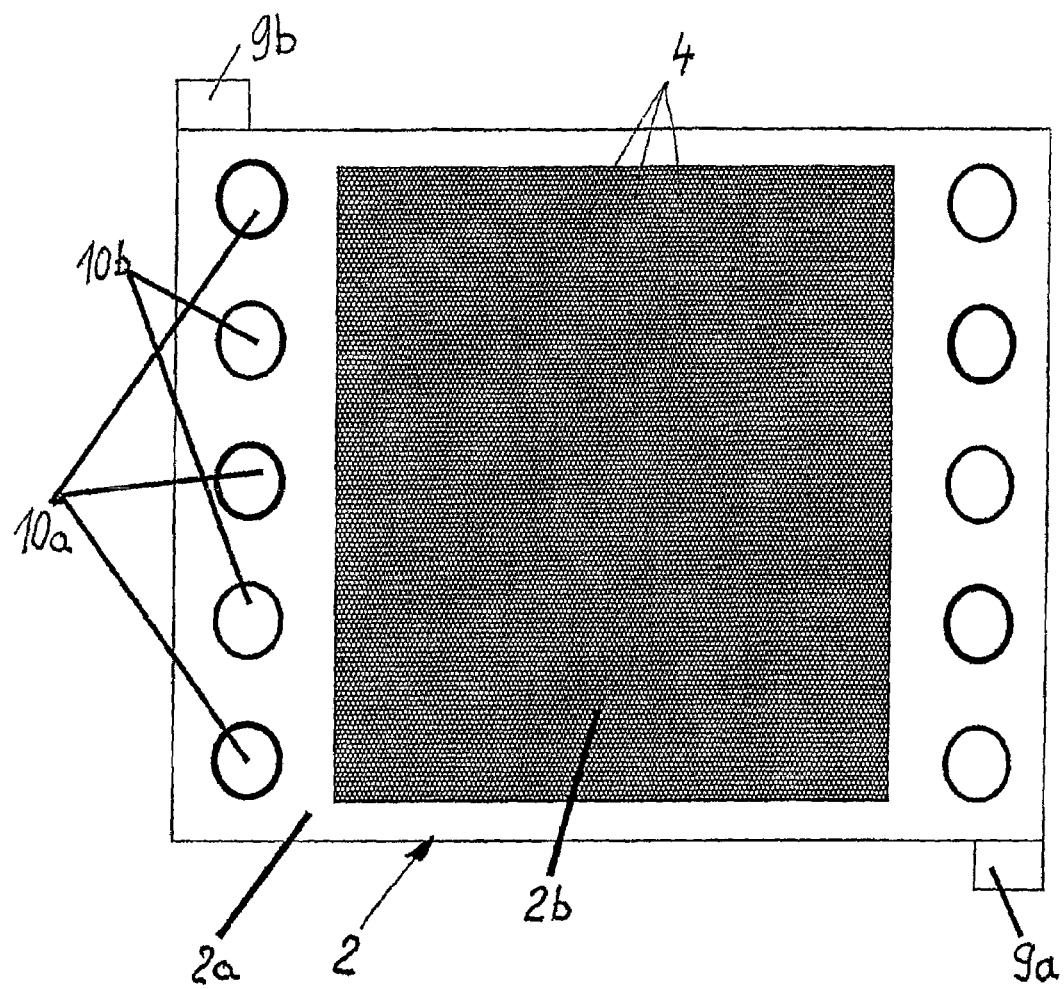
FIG. 2 is a top view of a bearing structure (without the ceramic functional layers).

The foil-like metal bearing structure 2 is made of a metal, which in itself forms a protective layer, which is electrically insulating and which is labelled with the reference numeral 2a in FIG. 1. Therefore, this bearing structure 2 operates as explained in detail prior to the description of the figures as an electric resistance heating element. For this reason, suitable power connection lugs 9a, 9b are provided as follows from FIG. 2 on the bearing structure 2 in the corner areas, which lie diagonally opposite each other and belong to the flat bearing structure. Furthermore, FIG. 2 depicts the flat shape of the bearing structure 2, which extends over the entire area of the individual fuel cell and also encompasses its edge sections, in which combustible gas passage orifices 10a and/or air passage orifices 10b are provided with respect to a gas conveyance that is integrated into the stack of fuel cells. FIG. 2 shows very clearly the perforated area 2b of the bearing structure with a plurality of passage orifices 4, which are filled as explained with reference to FIG. 1 with a gas-permeable, electrically conductive material.

A fuel cell in accordance with the invention allows a defined introduction of heat to start up the fuel cell and is, therefore, characterized by a significantly reduced start-up time while simultaneously heating up efficiently. At the same time, due to the thin, light-weight bearing structure only negligible thermo-mechanical stresses occur. This structure makes it possible to construct the cell by means of thin film technology. Finally, the edges, which insulate virtually semi-automatically owing to the protective oxide layer that forms, facilitate the construction of the stack, therefore, permitting in its design a plurality of details that depart from the above explanations without abandoning the subject of the claims appended hereto.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A solid oxide fuel cell comprising:
   a metal bearing structure for a cathode-electrolyte-anode unit, said metal bearing structure having passage orifices for a gas and being configured to operate as an electric resistance heating element for adjusting the fuel cell temperature, said metal bearing structure having a protective oxide layer which is electrically insulating for the metal bearing structure and power connection lugs;
   a bipolar plate; and
   an electrically conductive material in at least some of the passage orifices of the metal bearing structure which provides an electric connection with the bipolar plate,
   wherein an electric current may be guided through the metal bearing structure and wherein the cathode-electrolyte-anode unit is configured so that a gas may pass through the passage orifices of the metal bearing structure.

2. The solid oxide fuel cell of claim 1, wherein the metal bearing structure is capable of forming aluminum oxide or silicon oxide.

3. The solid oxide fuel cell of claim 1, comprising:
   a gas permeable and electrically conductive material in the form of a treated metal or an electrically conductive ceramic or in the form of an electrode material in at least some of the passage orifices of the metal bearing structure.

4. The solid oxide fuel cell of claim 1, comprising:
   an electrically conductive coating applied on the protective oxide layer of the bearing structure at least in the area of some of the passage orifices of the metal bearing structure.

5. The solid oxide fuel cell of claim 1, wherein said bipolar plate is provided in the solid oxide fuel cell opposite the metal bearing structure.

6. The solid oxide fuel cell of claim 1, wherein said metal bearing structure has a thickness of from 30 to 500 µm.

7. The solid oxide fuel cell of claim 1, wherein said cathode-electrolyte-anode unit comprises ceramic functional layers.

8. The solid oxide fuel cell of claim 1, wherein said metal bearing structure has multiple protective oxide layers.

9. A solid oxide fuel cell stack comprising a plurality of solid oxide fuel cells, which are stacked one above the other, each solid oxide fuel cell comprising:
   a metal bearing structure for a cathode-electrolyte-anode unit, said metal bearing structure having passage orifices for a gas and being configured to operate as an electric resistance heating element for adjusting the fuel cell temperature, said metal bearing structure having a protective oxide layer which is electrically insulating for the metal bearing structure and power connection lugs;
   a bipolar plate; and
   an electrically conductive material in at least some of the passage orifices of the metal bearing structure which provides an electric connection with the bipolar plate,
   wherein an electric current may be guided through the metal bearing structure and wherein the cathode-electrolyte-anode unit is configured so that a gas may pass through the passage orifices of the metal bearing structure.

10. The solid oxide fuel cell of claim 1, wherein the electric resistance heating element is configured to achieve a desired electric resistance by adjusting one or more variables selected from the group consisting of a thickness of the metal bearing structure and a structuring of the metal bearing structure.

11. The solid oxide fuel cell of claim 10, wherein adjusting a structuring of the metal bearing structure comprises adjusting a shape of the passage orifices.

12. The solid oxide fuel cell stack of claim 9, wherein the electric resistance heating element is configured to achieve a desired electric resistance by adjusting one or more variables selected from the group consisting of a thickness of the metal bearing structure and a structuring of the metal bearing structure.

13. The solid oxide fuel cell stack of claim 12, wherein adjusting a structuring of the metal bearing structure comprises adjusting a shape of the passage orifices.

14. The solid oxide fuel cell of claim 1, wherein the metal bearing structure has two power connection lugs provided in diagonally opposite corner areas of the metal bearing structure.

15. The solid oxide fuel cell stack of claim 9, wherein the metal bearing structure has two power connection lugs provided in diagonally opposite corner areas of the metal bearing structure.

* * * * *